United States Patent [19]

Alder et al.

[11] Patent Number: 5,060,865
[45] Date of Patent: Oct. 29, 1991

[54] FLUID FLOW RESTRICTOR SYSTEM

[75] Inventors: Malcolm R. Alder, Berkshire; Charles A. Boughtflower, Bucks, both of England

[73] Assignee: Imperial Chemical Industries plc, London, England

[21] Appl. No.: 450,321

[22] Filed: Dec. 5, 1989

[30] Foreign Application Priority Data

Dec. 15, 1988 [GB] United Kingdom ............... 8829413

[51] Int. Cl.$^5$ .............................................. B05B 1/30
[52] U.S. Cl. .................................. 239/332; 239/525; 239/586; 251/8; 138/45; 138/46
[58] Field of Search ............ 239/332, 525, 526, 586; 251/4, 7, 8; 138/44, 45, 46

[56] References Cited

U.S. PATENT DOCUMENTS

| | | | |
|---|---|---|---|
| 1,727,962 | 9/1929 | Buskard | 239/586 |
| 3,184,113 | 5/1965 | Curtis | 239/586 X |
| 3,203,631 | 8/1965 | Jutila | 239/586 X |
| 3,273,849 | 9/1966 | Hansson | 251/4 |
| 3,584,830 | 6/1971 | Koehn | 251/8 |
| 3,831,600 | 8/1974 | Yum et al. | 251/4 |
| 4,357,779 | 11/1982 | Maddock | 251/8 X |
| 4,424,832 | 1/1984 | Koda | 251/4 X |

FOREIGN PATENT DOCUMENTS

| | | | |
|---|---|---|---|
| 70794 | 7/1959 | France | 251/8 |
| 1319449 | 1/1963 | France | 239/586 |

Primary Examiner—Andres Kashnikow
Assistant Examiner—William Grant
Attorney, Agent, or Firm—Cushman, Darby & Cushman

[57] ABSTRACT

A fluid flow restrictor comprising a restrictor valve and a flexible tube housed in the valve, and an internally located outwardly biasing spring positioned in the tube such that the tube is biased against the action of the valve, the assembly being adapted to reduce the diameter of the tube with minimal permanent deformation of the tube.

8 Claims, 3 Drawing Sheets

FLUID FLOW RESTRICTOR SYSTEM

The present invention relates to a fluid flow restrictor system consisting of a fluid flow restrictor valve and tube assembly, for use in, for example, spraying systems and which are particularly useful in pesticide application systems.

Conventional hand-held spraying systems used for applying pesticides comprise an elongate support member with a spraying head at one end and a handle, motor and fluid supply unit at the other end. The pesticide is supplied under the action of gravity to the spraying head. The size of the droplets and the area over which the fluid is ejected is determined by the rate of rotation of the atomising disc. By controlling the voltage applied to the motor, the rate of rotation of the disc can be adjusted. The flow rate is adjusted by inserting a 'fitting' into a socket in the spray head which physically restricts the diameter of the fluid supply tube. The great disadvantage of these systems is the inability of the operator to control the rate of fluid supply to the spraying head from the handle end while continuing the spraying operation. In this system the operator must shut down the fluid supply completely in order to adjust the fluid output rate and the adjustment is extremely crude and uncalibrated.

The disadvantages of the system described above can be overcome by incorporation of a valve on or near the handle, which can be operated while the sprayer is in use to restrict or increase the flow of fluid to the spray head. In the course of experimentation it was found that conventional pinch valves are unsuitable for this application. The fluid supply tube deforms after prolonged pinching and is prone to crimp set. The effect of deformity and crimping of the tube is to disrupt the fluid flow creating eddies and turbulence. In some cases, depending on the rheological properties of the fluids, this causes a thixotropic reaction i.e. thickening of the fluid, making it harder to spray evenly. The flow rate through a conventional gate valve changes over a period of time. A further disadvantage of conventional pinch valves which pinch a small length of the tube, is that while the tube is deformed under pinching, the fluid flow is also disrupted by the sudden barrier presented in the path of the flow. This also caused turbulence and eddies with the same consequences as described above. The advantage of the valve and tube assembly of the present invention is that the tube is prevented from crimping and the barrier to fluid flow is removed in favour of a sloping restriction which does not interfere with the flow.

According to the present invention there is provided a fluid flow restrictor assembly comprising a restrictor valve and a flexible tube housed in said valve, and an internally located outwardly biasing spring positioned in the tube such that the tube is biased against the action of the valve, the assembly being adapted to reduce the diameter of the tube with minimal permanent deformation of the tube.

In use, the fluid flow restrictor valve is to be positioned on the part of the fluid supply tube which has been fitted with an internally located spring. Preferably, the spring is loosely coiled with the longitudinal axis parallel to the longitudinal axis of the tube and extends beyond the length of the tube located in the valve housing. The tube is preferably made of silicon but could be made of any flexible material.

The valve consists of a valve housing which is preferably formed in two halves for easy assembly on the tube and injection moulded in plastic. The valve housing is preferably substantially triangular in shape, and contains a plunger adapted to the shape of the housing. The fluid supply tube is located in a channel between the valve plunger and the valve housing.

The valve plunger is preferably formed with a platform which is slightly smaller than the length of the tube and is preferably formed in two co-operating halves, and preferably injection moulded in plastic. The platform is longer than the diameter of the tube which it houses, preferably at least 2 times as long and most preferably is from 4 to 6 times as long as the diameter of the tube. The plunger operating mechanism is preferably a manual operation by means of a handle located in a conduit in the head of the plunger.

In operation the valve is used to close or open the fluid supply tube or to define various positions in between these extremes. When the tube has been closed by the valve and subsequently opened, on opening, the internally located spring in regaining its original configuration forces the tube to regain its original dimensions with the minimum of deformation which could affect the flow of the fluid. In a partially closed position the length of the raised platform relative to the diameter of the tube is important to ensure that the tube is not 'pinched' but pressed along a portion of the tube, the edges of which slope gently towards the middle. The gently sloping edges do not disrupt the fluid flow thereby preventing turbulence in the tube. According to the present invention there is further provided a fluid flow restrictor assembly comprising a restrictor valve and a flexible tube housed in said valve and an internally located outwardly biasing spring positioned in the tube such that the tube is biased against the action of the valve wherein the restrictor valve, comprises a valve housing defining an interior space, and a valve plunger located in the interior of the valve housing, one wall of the valve housing and the plunger defining a tube locating channel, said channel being longer than the diameter of the tube, said plunger having an operating mechanism by which the plunger is raised and lowered in the valve housing, the operating mechanism being externally operable, whereby when the plunger is raised, the tube is pushed against the wall of the valve housing restricting the fluid flow through the tube.

The invention also extends to a spray application system incorporating a fluid flow restrictor assembly as described herein and in particular to a hand-held pesticide application system incorporating such a fluid flow restrictor assembly. Accordingly there is provided a hand-held pesticide application system comprising an elongate support member provided with a spraying head at one end and a handle at the other, a fluid supply system and a motor unit, the fluid supply system consisting of a reservoir of fluid and a flexible tube supplying fluid to the spraying head, and having a fluid flow restrictor assembly situated between the spraying head and the handle, the fluid flow restrictor assembly comprising a restrictor valve with the flexible tube housed in said valve, and an internally located outwardly biasing spring positioned in the tube such that the tube is biased against the action of the valve, the assembly being adapted to reduce the diameter of the tube with minimal permanent deformation of the tube.

The pesticide application system is particularly useful with formulations which have a viscosity in the range of 15 to $25 \times 10^{-6} m^2/s$ (centistokes) at 20° C., for example, a preferred viscosity is $20 \times 10^{-6} m^2/s$ (centistokes) at 20° C.

Such formulations are preferably aqueous or aqueous based emulsions. Examples of particularly useful pesticides are herbicides and plant growth regulators. Especially preferred examples of herbicide formulations are, Bullseye TM, (active ingredients: aminotriazole, atrazine), Snapper (active ingredients: aminotriazole, atrazine, 2,4-D) and Verdone TM (active ingredients: 2,4-D, mecoprop).

Especially preferred examples of plant growth regulator formulations are Holdfast TM (active ingredient paclobutrazol), Holdfast D (active ingredients: paclobutrazol, dicamba) and the mixture of paclobutrazol and mefluidide.

The embodiment of the present invention will now be more particularly described, by way of example, with reference to the accompanying drawings in which.

Figure 1:
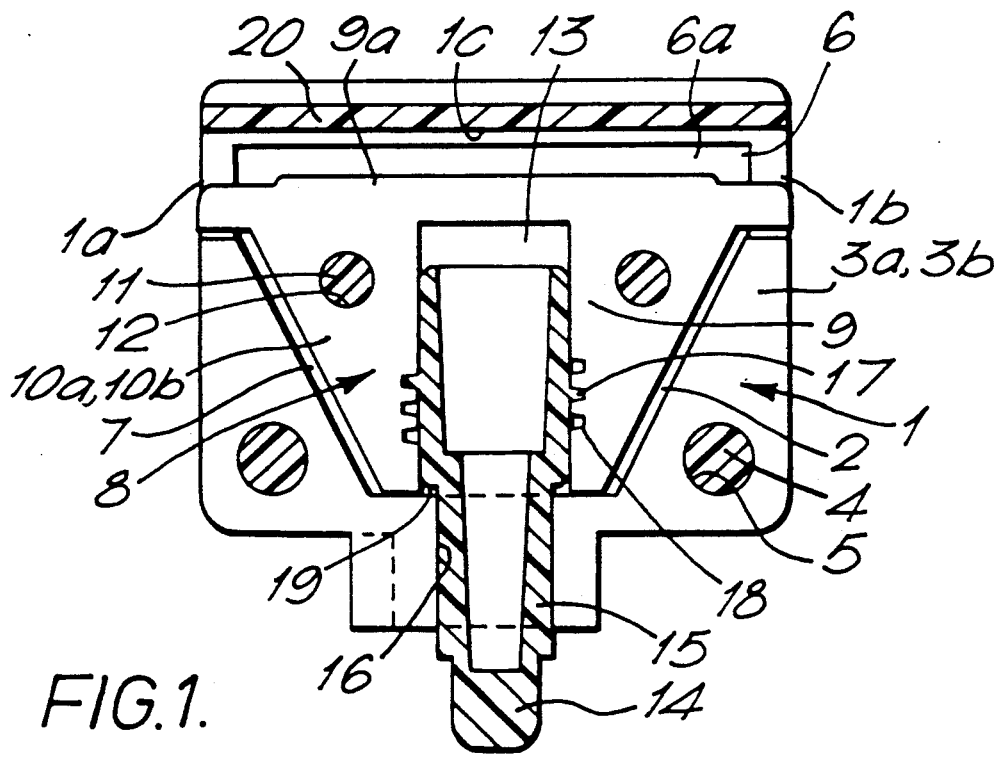
FIG. 1 is a cross sectional view of the valve housing and plunger with-out tube assembly.
Figure 2:
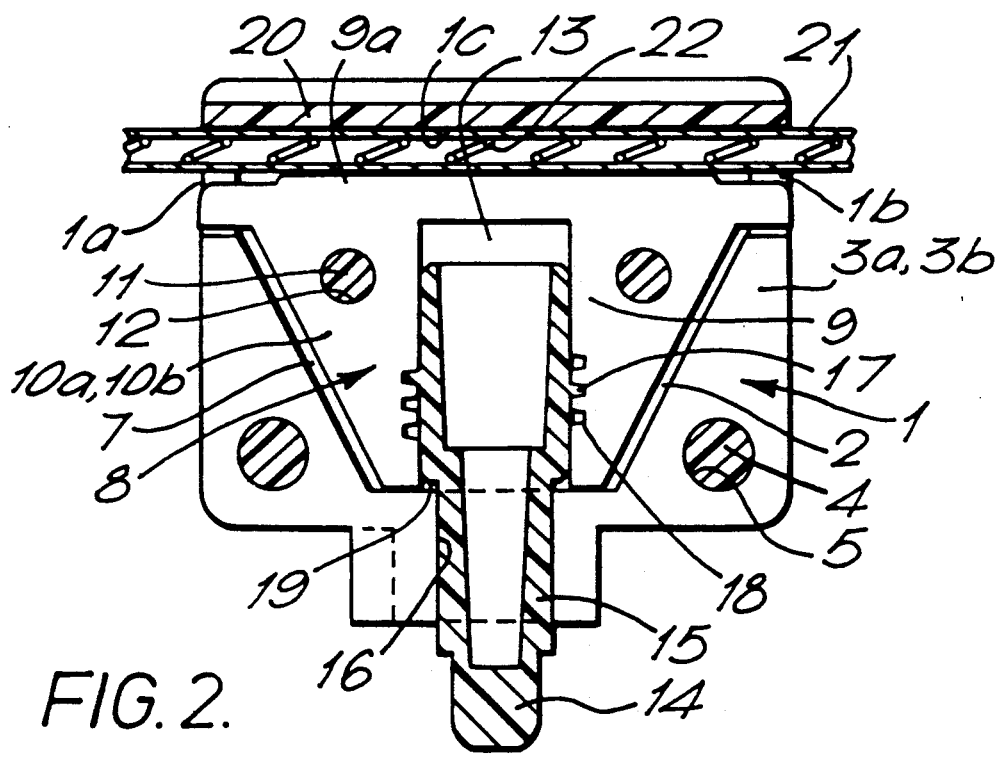
FIG. 2 is a cross sectional view of the valve housing and plunger with tube assembly.
Figure 3:
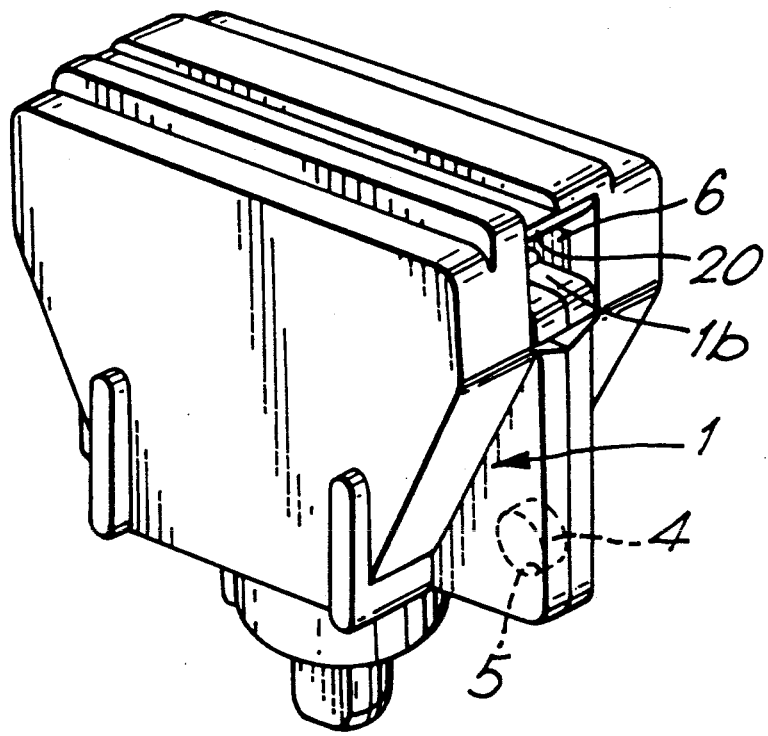
FIG. 3 is a perspective view of the valve housing.

In the embodiment of the present invention, a fluid flow restrictor valve as shown in FIGS. 1, 2 and 3 consists of a valve housing 1 defining a substantially triangular interior space 2. The valve housing 1 is moulded in two basically similar cooperating halves 3a, 3b. One half 3a of the valve housing 1 is provided with lugs 4 which fit closely with co-operating holes 5 on the other half of the valve housing 1. When the two halves 3a, 3b are pushed together the lugs 4 fit closely in the holes 5 providing a tight fit. The interior space 2 of the valve housing 1 has a tube locating area 6 and a valve plunger locating area 7. The tube locating area 6 is open on both sides 1a, 1b of the valve housing 1, defining a channel 6a between the upper wall 1c of the valve housing 1 and a valve plunger 8. The valve plunger 8 consists of a substantially triangular head 9 with a raised platform 9a, formed in two basically similar halves 10a, 10b, one half 10b, being provided with lugs 11 which co-operate with holes 12 provided in the other half 10a. The head 9 defines an interior space 13 in which a handle 14 is located. The handle 14 has an elongate member 15 which extends from the head 9 through a conduit 16 to the outside of the valve housing 1, which enables external operation of the plunger 8. The handle 14 has a screw thread 17 which locates in grooves 18 on the wall of the interior space 13 of the head 9 which when the handle 14 is turned moves the position of the head 9 relative to the handle 14. When the plunger is located in the valve housing 1, a flange 19 positions the handle 14 in the conduit 16. The plunger 8 is moveable between two extreme positions, the open position defined by the handle 8 being turned up to the top of the grooves 18, and the closed position being limited by the shelf 20 in the tube locating area 6 which limits the upward movement of plunger 8. FIG. 2 shows that in operation the valve housing 1 containing the plunger 8 is assembled with a tube 21 containing a loosely coiled spring 22 in the channel 6a, while the plunger 8 is in the open position. In order to close the valve and restrict fluid supply, the handle 14 is turned anticlockwise which raises the head 9 relative to the handle 14, which causes the plunger 8 to move the tube 21 against the wall 1c of the valve housing 1 in the channel 6 and thereby restrict the diameter of the tube 21. As shown in FIG. 2, the spring 22 is disposed in the tube 21 to engage the tube and bias it towards its normal, maximum diameter prior to, during and following action of the valve. Thus, the spring 22 biases the tube 21 into its normal configuration so that when the pressure applied by the plunger 8 is released the spring 22 assumes its normal configuration and biases the tube 21 outwardly thus preventing permanent deformity of the tube 21 caused by the action of the valve.

Figure 4:
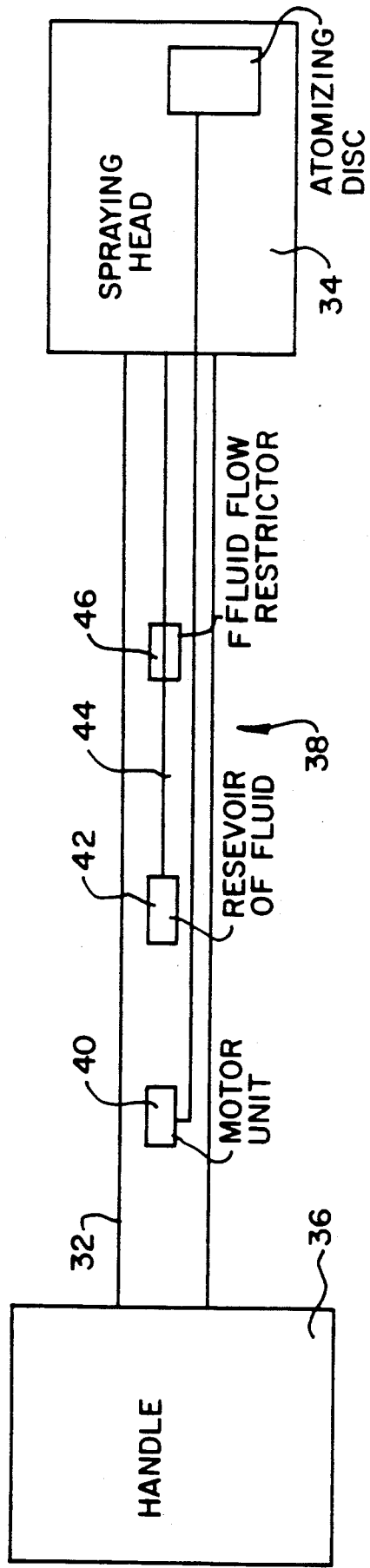
FIG. 4 is a schematic view of the restrictor valve of the invention provided in a spray application system.

A spray application system such as a hand-held pesticide application system incorporating a fluid flow restrictor assembly as described herein is schematically illustrated in FIG. 4. The hand-held pesticide application system 30 comprises an elongated support member 32 provided with a spraying head 34 at one end and a handle 36 at the other end. A fluid supply system 38 and a motor unit 40 are further provided for the application system. The fluid supply system 38 consists of a reservoir of fluid 42 and a flexible tube 44 for supplying fluid to the spraying head 34. A fluid flow restrictor assembly 46 formed in accordance with the invention is situated between the spraying head 34 and the handle 36. The motor unit, as is well known in the art, is provided to control the rate of rotation of the atomizing disc provided within the spray head.

EXAMPLE

This example compares the fluid flow through a fluid flow restrictor assembly of the present invention with that of a conventional gate valve.

Method

The valves were set up to allow a restricted flow rate of an oil in water emulsion formulation (Snapper) through conventional tubing. The actual flow rates were measured over a period of three minutes. The flow rate was measured by weighing the amount of fluid which passed through the valve in the time period.

| Time | Gate Valve | Fluid Flow Restrictor Assembly |
| --- | --- | --- |
| 1 minute | 55 g | 32 g |
| 2 minutes | 47 g | 32 g |
| 3 minutes | 30 g | 32 g |

The results clearly demonstrate that the fluid flow rate through the gate valve deteriorates over a short space of time, indicating a change in the viscosity caused by the type of restriction made in the tube by the gate valve. The fluid flow restrictor assembly, however, restricts the tube gently so that the restriction causes no significant barrier to fluid flow. The result reflects the fact that the flow rate is unchanged over the same time period and shows that there has been no change in the viscosity of the formulation.

We claim:

1. A fluid flow restrictor assembly comprising a restrictor valve and a flexible tube housed in said valve, and an internally located outwardly biasing coil spring positioned in the tube and biasing the tube towards its maximum diameter prior to, during, and following action of the valve such that the tube is biased against the action of the valve, whereby when the valve pressure is released, the coil spring assumes it normal configuration and biases the tube outwardly, thereby preventing permanent deformity of the tube caused by the action of the valve.

2. A fluid flow restrictor assembly according to claim 1 wherein the restrictor valve comprises a valve housing defining an interior space, and a valve plunger located in the interior of the valve housing, one wall of the valve housing and the plunger defining a tube locating channel, said channel being longer than the diameter of the tube, said plunger having an operating mechanism by which the plunger is moved towards and moved away from the one wall of the valve housing, the operating mechanism being externally operable, whereby when the plunger is moved towards the one wall, the tube is pushed against the one wall of the valve housing restricting the fluid flow through the tube.

3. A fluid flow restrictor assembly according to claim 2 wherein the plunger is provided with a raised platform.

4. A fluid flow restrictor assembly according to claim 3 wherein the raised platform is from 2 to 6 times longer than the diameter of the tube housed therein.

5. A fluid flow restrictor assembly according to claim 4 wherein the restrictor valve is injection molded.

6. A spray application system incorporating a fluid flow restrictor assembly according to claim 5.

7. A hand-held pesticide application system comprising an elongate support member provided with a spraying head at one end and a handle at the other, a fluid supply system and a motor unit for controlling the rate of rotation of an atomizing disc within the spray head, the fluid supply system consisting of a reservoir of fluid and a flexible tube supplying fluid to the spraying head, and having a fluid flow restrictor assembly situated between the spraying head and the handle, the fluid flow restrictor assembly comprising a restrictor valve with the flexible tube housed in said valve, and an internally located outwardly biasing coil spring positioned in the tube and biasing the tube towards its maximum diameter prior to, during, and following action of the valve such that the tube is biased against the action of the valve, whereby when the valve pressure is released, the coil spring assumes it normal configuration and biases the tube outwardly, thereby preventing permanent deformity of the tube caused by the action of the valve.

8. A hand-held pesticide application system according to claim 7 wherein the restrictor valve comprises a valve housing defining an interior space, and a valve plunger located in the interior of the valve housing, one wall of the valve housing and the plunger defining a tube locating channel, said channel being longer than the diameter of the tube, said plunger having an operating mechanism by which the plunger is moved towards and moved away from the one wall of the valve housing, the operating mechanism being externally operable, whereby when the plunger is moved towards the one wall, the tube is pushed against the one wall of the valve housing restricting the fluid flow through the tube.

* * * * *